(12) United States Patent
Zhang et al.

(10) Patent No.: US 11,663,544 B2
(45) Date of Patent: May 30, 2023

(54) SYSTEM AND METHODS FOR RISK ASSESSMENT IN A MULTI-TENANT CLOUD ENVIRONMENT

(71) Applicant: salesforce.com, inc., San Francisco, CA (US)

(72) Inventors: Jiaping Zhang, San Francisco, CA (US); Ana Bertran, San Francisco, CA (US); Elena Novakovskaia, Foster City, CA (US); Zhanara Amans, San Francisco, CA (US); Garren Bellew, Louth (IE); Philip Dolle, Discovery Bay, CA (US)

(73) Assignee: salesforce.com, inc., San Francisco, CA (US)

( * ) Notice: Subject to any disclaimer, the term of this patent is extended or adjusted under 35 U.S.C. 154(b) by 24 days.

(21) Appl. No.: 16/774,822

(22) Filed: Jan. 28, 2020

(65) Prior Publication Data

US 2021/0232995 A1    Jul. 29, 2021

(51) Int. Cl.
| | |
|---|---|
| *G06Q 10/06* | (2023.01) |
| *G06N 20/00* | (2019.01) |
| *G06Q 10/10* | (2023.01) |
| *G06Q 10/0635* | (2023.01) |
| *G06Q 10/0637* | (2023.01) |

(52) U.S. Cl.
CPC ......... *G06Q 10/0635* (2013.01); *G06N 20/00* (2019.01); *G06Q 10/06375* (2013.01); *G06Q 10/10* (2013.01)

(58) Field of Classification Search
CPC .................................................. G06Q 10/0635
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| | (Continued) | |

OTHER PUBLICATIONS

Djemame et al, A Risk Assessment Framework for Cloud Computing, IEEE Transactions on Cloud Computing, vol. 4, No. 3, Jul.-Sep. 2016, 265-278 (Year: 2016).*

(Continued)

*Primary Examiner* — Andre D Boyce
(74) *Attorney, Agent, or Firm* — LKGlobal | Lorenz & Kopf, LLP

(57) ABSTRACT

A method of early warning and risk assessment of incidents in a multi-tenant cloud environment is provided. The method includes: capturing a plurality of data metrics; automatically generating derived features from the plurality of captured data metrics; automatically selecting risk assessment features from the derived features and the captured data metrics; and predicting the risk of an incident in the multi-tenant cloud environment within a specified time window in the future and one or more possible root causes of the incident by applying the newly selected risk assessment features to a trained risk assessment model. The trained risk assessment model has been trained using machine learning techniques to predict the risk of an incident in the multi-tenant cloud environment within a specified time window in the future, provide an explanation of possible root causes of the incident, and assign a strength level to each possible root cause.

20 Claims, 4 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,782,795 B1* | 7/2014 | Field ................. H04L 63/205 |
| | | 726/25 |
| 9,501,649 B2* | 11/2016 | Sharma ................. G06F 8/60 |
| 9,571,516 B1* | 2/2017 | Curcic ................. H04L 67/22 |
| 9,722,895 B1* | 8/2017 | Sarukkai ............. H04L 67/22 |
| 9,853,992 B1* | 12/2017 | Kumar ............. H04L 63/1425 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2012/0265976 A1* | 10/2012 | Spiers ............. G06F 9/45533 |
| | | 713/2 |
| 2013/0212497 A1 | 8/2013 | Zelenko et al. |
| 2013/0218948 A1 | 8/2013 | Jakobson |
| 2013/0218949 A1 | 8/2013 | Jakobson |

(56) References Cited

U.S. PATENT DOCUMENTS

| | | | |
|---|---|---|---|
| 2013/0218966 A1 | 8/2013 | Jakobson | |
| 2013/0247216 A1 | 9/2013 | Cinarkaya et al. | |
| 2016/0232024 A1* | 8/2016 | Hamilton, II | G06F 21/53 |
| 2016/0364927 A1* | 12/2016 | Barry | H04L 41/06 |
| 2017/0061338 A1* | 3/2017 | Mack | G06Q 10/067 |
| 2017/0078314 A1* | 3/2017 | Mohanty | H04L 63/145 |
| 2017/0200006 A1* | 7/2017 | Gershoni | G06Q 10/06 |
| 2017/0251013 A1* | 8/2017 | Kirti | H04L 63/1441 |
| 2017/0295197 A1* | 10/2017 | Parimi | H04L 63/10 |
| 2017/0332238 A1* | 11/2017 | Bansal | H04L 67/02 |
| 2017/0364345 A1* | 12/2017 | Fontoura | G06F 9/5072 |
| 2018/0027006 A1* | 1/2018 | Zimmermann | H04L 63/0245 |
| | | | 726/11 |
| 2018/0032399 A1* | 2/2018 | Johnson | G06F 11/2033 |
| 2018/0191771 A1* | 7/2018 | Newman | H04L 63/1433 |
| 2018/0232833 A1* | 8/2018 | Gordon | G06Q 30/0601 |
| 2018/0287902 A1* | 10/2018 | Chitalia | H04L 43/045 |
| 2018/0288087 A1* | 10/2018 | Hittel | H04L 67/10 |
| 2018/0302303 A1* | 10/2018 | Skovron | H04L 43/065 |
| 2018/0365591 A1* | 12/2018 | Gucci | G06N 20/00 |
| 2019/0020674 A1* | 1/2019 | Vervier | G06F 21/577 |
| 2019/0068627 A1* | 2/2019 | Thampy | H04L 63/1416 |
| 2019/0158503 A1* | 5/2019 | Bansal | H04L 63/0876 |
| 2019/0354690 A1* | 11/2019 | Brigandi | H04W 12/02 |
| 2020/0089848 A1* | 3/2020 | Abdelaziz | H04L 63/0815 |
| 2020/0089887 A1* | 3/2020 | Luthra | G06N 20/20 |
| 2020/0106793 A1* | 4/2020 | Vanamali | H04L 63/1416 |
| 2020/0220885 A1* | 7/2020 | Will | G06F 21/554 |
| 2020/0233955 A1* | 7/2020 | Ramzan | G06F 9/5027 |
| 2020/0234212 A1* | 7/2020 | Garay | G06F 16/2465 |
| 2020/0242222 A1* | 7/2020 | Machani | H04L 63/102 |
| 2020/0250315 A1* | 8/2020 | Sunkavally | G06F 21/6254 |
| 2020/0349527 A1* | 11/2020 | Malchikov | G06N 20/00 |
| 2021/0037025 A1* | 2/2021 | Schlarman | H04L 63/1408 |
| 2021/0044563 A1* | 2/2021 | Reyes | H04L 63/029 |
| 2021/0120013 A1* | 4/2021 | Hines | G06N 3/08 |
| 2021/0133357 A1* | 5/2021 | Machani | G06F 21/602 |
| 2021/0136089 A1* | 5/2021 | Costea | G06F 21/554 |
| 2021/0158193 A1* | 5/2021 | Davis | G06N 5/045 |
| 2021/0160271 A1* | 5/2021 | Garcarz | H04L 63/1416 |
| 2021/0182117 A1* | 6/2021 | Chen | H04L 45/46 |

OTHER PUBLICATIONS

Fahad F. Alruwaili, SOCaaS: Security Operations Center as a Service for Cloud Computing Environments, International Journal of Cloud Computing and Services Science (IJ-CLOSER), vol. 3, No. 2, Apr. 2014, pp. 87-96 (Year: 2014).*

* cited by examiner

SYSTEM AND METHODS FOR RISK ASSESSMENT IN A MULTI-TENANT CLOUD ENVIRONMENT

TECHNICAL FIELD

Embodiments of the subject matter described herein relate generally to fault prediction in computing systems, and more particularly to automated, proactive systems and methods for reducing incidents in computing systems within a specified time window.

BACKGROUND

Many enterprises use cloud-based services and infrastructure for computing needs. Cloud-based service providers often support multiple enterprises (or tenants) using common computer hardware and data storage. Customers of a cloud-based service provider need to trust that they can run their business on the cloud-based platform with consistency and predictability. Incidents are events in the infrastructure of the cloud-based platform wherein one or more customers experience degradation or unavailability of service. Prevention and/or quick recovery from incidents is needed to ensure customer confidence in the cloud-based service provider.

Prevention and/or quick recovery from incidents can be challenging with a multi-tier, multi-tenant infrastructure due to the complexity in serving a very large group of customers widely diverse in terms of business size, business cycle and workload patterns while cohabiting on the same infrastructure. Each tenant may develop, deploy, and use cloud-based service provider products/applications at will, causing an ever-changing workload characteristic that consistently evolves over time. Simultaneously, infrastructure may continuously evolve with hardware refreshes and capacity planning. The changes in these multiple factors together with changes to the cloud-based service provider products/applications can lead to severe incidents in cloud-based service provider infrastructure and interruptions in service that are difficult to predict ahead of time (e.g., with some lead time). Additionally, because of these factors root cause identification can become a time-consuming task.

It can be challenging to monitor potential risks of service interruption at individual service locations on a given day or hour and to triage root causes. Traditionally, service providers use "service availability" metrics to evaluate how reliable their services are. Such an approach masks out the severity and impact of individual incidents, which can be detrimental and result in substantial degradation of trust in relationships with the customer(s).

Accordingly, it is desirable to provide systems and methods for predicting the likelihood of incident occurrence within a specified time window and identifying root causes of the predicted incident to allow for proactive efforts to reduce the likelihood, length, and/or severity of an incident occurrence. Furthermore, other desirable features and characteristics of the present disclosure will become apparent from the subsequent detailed description and the appended claims, taken in conjunction with the accompanying drawings and the background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

SUMMARY

Figure 1:
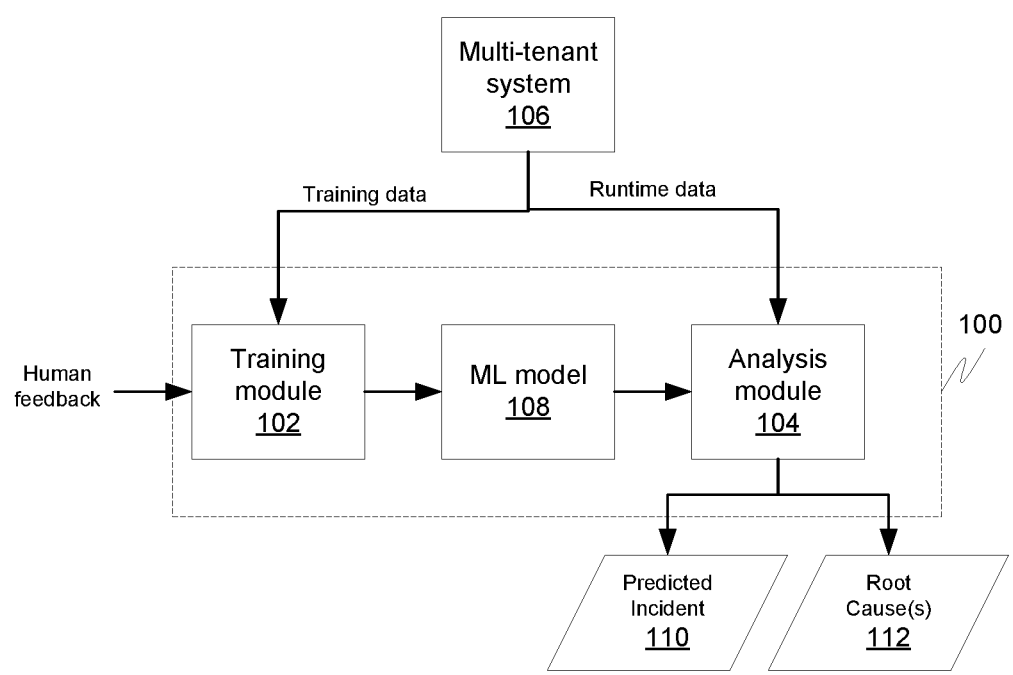
FIG. 1 is a block diagram depicting an example incident risk assessment system, in accordance with some embodiments.

This summary is provided to describe select concepts in a simplified form that are further described in the Detailed Description. This summary is not intended to identify key or essential features of the claimed subject matter, nor is it intended to be used as an aid in determining the scope of the claimed subject matter. Additionally, in the text of this document the notion of "future" is used in a general sense. Those of ordinary skill in the art would clearly recognize that when a system and/or model is used for prediction, "future" refers to a point of time subsequent to the latest time available in data records, and in the case of retrospective root cause analysis, "future" refers to the point of time when the incident took place and that is subsequent to the latest data record used to investigate such past incident.

An incident risk assessment system and method are disclosed. In one embodiment, a processor-implemented method comprises: capturing a plurality of data metrics over a time period that ends prior to a moment of interest by at least a predefined lead time period; automatically generating derived features from the plurality of captured data metrics; automatically selecting risk assessment features from the derived features and the captured data metrics; and predicting the risk of an incident in a multi-tenant cloud environment within a specified time window in the future and one or more possible root causes of the incident by applying the newly selected risk assessment features to a trained risk assessment model, wherein the trained risk assessment model has been trained using machine learning techniques to predict the risk of an incident in the multi-tenant cloud environment within a specified time window in the future, provide an explanation of possible root causes of the incident, and assign a strength level to each possible root cause, wherein the strength level pertains to a certain timeframe and changes over time.

In another embodiment, a processor-implemented method of early warning and risk assessment of incidents in a multi-tenant cloud environment is provided. The method includes: capturing a plurality of data metrics relating to the multi-tenant cloud environment over a time period that ends prior to a moment of interest by at least a predefined lead time period; automatically generating derived features from the plurality of data metrics, wherein the derived features include one or more features that describe the temporal patterns of one or more data metrics and their compounding effect over time; automatically selecting relevant features from the derived features and the captured data metrics, wherein the selected relevant features are sufficient to explain the temporal variations of an incident occurrence that is to be predicted; automatically training, testing, and evaluating an incident risk assessment model using machine learning techniques with the selected relevant features, wherein the incident risk assessment model is trained to predict the risk of an incident in the multi-tenant cloud environment within a specified time window in the future, provide an explanation of possible root causes of the incident, and assign a strength level to each possible root cause; capturing a plurality of newly captured data metrics; automatically generating newly derived features from the plurality of newly captured data metrics, wherein the newly derived features include one or more features that describe the temporal patterns of one or more newly captured data metrics and their compounding effect over time; automatically selecting newly selected risk assessment features from the newly derived features and the newly captured data metrics; and predicting the risk of an incident in the multi-tenant cloud environment within a specified time window in the future and one or more possible root causes of the incident by applying the newly selected risk assessment features to the trained risk assessment model.

In another embodiment, an early warning and risk assessment system for early warning and risk assessment of incidents in a multi-tenant cloud environment is provided. The system includes one or more processors configured by programming instructions on non-transitory computer readable media. The system is configured by the programming instruction to: capture a plurality of data metrics relating to the multi-tenant cloud environment; automatically generate derived features from the plurality of data metrics, wherein the derived features include one or more features that describe the temporal patterns of one or more data metrics and their compounding effect over time; automatically select relevant features from the derived features and the captured data metrics, wherein the selected relevant features are sufficient to explain the temporal variations of an incident occurrence that is to be predicted; automatically train, test, and evaluate an incident risk assessment model using machine learning techniques with the selected relevant features, wherein the incident risk assessment model is trained to predict the risk of an incident in the multi-tenant cloud environment within a specified time window in the future, provide an explanation of possible root causes of the incident, and assign a strength level to each possible root cause; capture a plurality of newly captured data metrics; automatically generate newly derived features from the plurality of newly captured data metrics, wherein the newly derived features include one or more features that describe the temporal patterns of one or more newly captured data metrics and their compounding effect over time; automatically select newly selected risk assessment features from the newly derived features and the newly captured data metrics; and predict the risk of an incident in the multi-tenant cloud environment within a specified time window in the future and one or more possible root causes of the incident by applying the newly selected risk assessment features to the trained risk assessment model.

In another embodiment, a processor-implemented method of early warning and risk assessment of incidents in a multi-tenant cloud environment is provided. The method includes: capturing, by a processor, a plurality of newly captured data metrics; automatically generating, by the processor, newly derived features from the plurality of newly captured data metrics, wherein the newly derived features include one or more features that describe the temporal patterns of one or more of the newly captured data metrics and their compounding effect over time; automatically selecting, by the processor, newly selected risk assessment features from the newly derived features and the newly captured data metrics; and predicting, by the processor, the risk of an incident in the multi-tenant cloud environment within a specified time window in the future and one or more possible root causes of the incident by applying the newly selected risk assessment features to a trained risk assessment model, wherein the trained risk assessment model has been trained using a method including: capturing a plurality of data metrics relating to the multi-tenant cloud environment; automatically generating derived features from the plurality of data metrics, wherein the derived features include one or more features that describe the temporal patterns of one or more data metrics and their compounding effect over time; automatically selecting relevant features from the derived features and the captured data metrics, wherein the selected relevant features are sufficient to explain the temporal variations of an incident occurrence that is to be predicted; automatically training, testing, and evaluating the incident risk assessment model using machine learning techniques with the selected relevant features, wherein the incident risk assessment model is trained to predict the risk of an incident in the multi-tenant cloud environment within a specified time window in the future, provide an explanation of possible root causes of the incident, and assign a strength level to each possible root cause.

In another embodiment, a processor-implemented method of early warning and risk assessment of incidents in a multi-tenant cloud environment is provided. The method includes: capturing a plurality of data metrics relating to an infrastructure area, a business area, and a product area associated with the multi-tenant cloud environment, wherein the plurality of data metrics relating to the infrastructure area include data metrics relating to the infrastructure of the multi-tenant cloud environment, the plurality of data metrics relating to the business area include data metrics relating to client use of the multi-tenant cloud environment, and the plurality of data metrics in the product area relating to the product area include data metrics relating to product development in the multi-tenant cloud environment. The method further includes automatically generating derived features from the plurality of data metrics relating to the infrastructure area, the business area, and the product area, wherein the derived features include one or more features that describe the temporal patterns of one or more data metrics and their compounding effect over time; automatically selecting relevant features from the derived features and the captured data metrics, wherein the selected relevant features are sufficient to explain the temporal variations of a target that is to be predicted (e.g., incident occurrence); automatically training, testing, and evaluating an incident risk assessment model using machine learning techniques with the selected relevant features, wherein the incident risk assessment model is trained to predict the risk of an incident in the multi-tenant cloud environment within a specified time window in the future, provide an explanation of possible root causes of the incident, and assign a strength level to each possible root cause; capturing a plurality of newly captured data metrics relating to the infrastructure area, the business area, and the product area; automatically generating newly derived features from the plurality of newly captured data metrics relating to the infrastructure area, the business area, and the product area; automatically selecting newly selected risk assessment features from the newly derived features and the newly captured data metrics; and predicting the risk of an incident in the multi-tenant cloud environment within a specified time window in the future, providing an explanation of possible root causes of the incident, and assigning a strength level to each possible root cause by applying the newly selected risk assessment features to the trained risk assessment model.

Furthermore, other desirable features and characteristics will become apparent from the subsequent detailed description and the appended claims, taken in conjunction with the accompanying drawings and the preceding background.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

The subject matter described herein discloses apparatus, systems, techniques and articles for predicting an individual incident in the noise of a multi-tenant, multi-tier and multi-substrate environment. The disclosed apparatus, systems, techniques and articles may allow a service provider to identify the time when an incident will most likely occur and to list the reasons for why the incident may occur. The disclosed apparatus, systems, techniques and articles may solve the problem of predicting incidents in a multi-tenant/multi-tier/multi-substrate environment where an incident may occur because of compounding factors, through the development and use of an incident risk assessment machine learning (ML) model that uses a composite of available and relevant data from three areas, infrastructure, product and customer/business data, within an iterative and human-in-the-loop framework.

FIG. 1 is a block diagram depicting an example incident risk assessment system 100. The example incident risk assessment system 100 includes a controller for implementing a training module 102 and an analysis module 104. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The training module 102 receives training data from a multi-tenant system 106 that is being monitored for potential future incidents within a specified time window and uses machine learning techniques to train an incident risk assessment ML model 108. The analysis module 104 receives runtime data from the multi-tenant system 106 that is monitored for potential future incidents within a specified time window and analyzes the runtime data using the incident risk assessment ML model 108 to predict a potential incident 110 within a specified time window in the future and to identify potential root causes 112 of the predicted incident. The training module 102 may also receive human feedback for adjusting the trained incident risk assessment model 108, for example, by improving the data/labels used to train the incident risk assessment model.

The example training module 102 is configured to capture a plurality of data metrics relating to the multi-tenant cloud environment; automatically generate derived features from the plurality of data metrics, wherein the derived features include one or more features that describe the temporal patterns of one or more data metrics and their compounding effect over time; automatically select relevant features from the derived features and the captured data metrics, wherein the selected relevant features are sufficient to explain the temporal variations of an incident occurrence that is to be predicted; automatically train, test, and evaluate an incident risk assessment model 108 using machine learning techniques with the selected relevant features, wherein the incident risk assessment model is trained to predict the risk of an incident in the multi-tenant cloud environment within a predefined time window in the future, provide an explanation of possible root causes of the incident, and assign a strength level to each possible root cause;

The example analysis module 104 is configured to capture a plurality of newly captured data metrics; automatically generate newly derived features from the plurality of newly captured data metrics, wherein the newly derived features include one or more features that describe the temporal patterns of one or more newly captured data metrics and their compounding effect over time; automatically select newly selected risk assessment features from the newly derived features and the newly captured data metrics; and predict the risk of an incident in the multi-tenant cloud environment within a specified time window in the future and one or more possible root causes of the incident by applying the newly selected risk assessment features to the trained risk assessment model.

Figure 2:
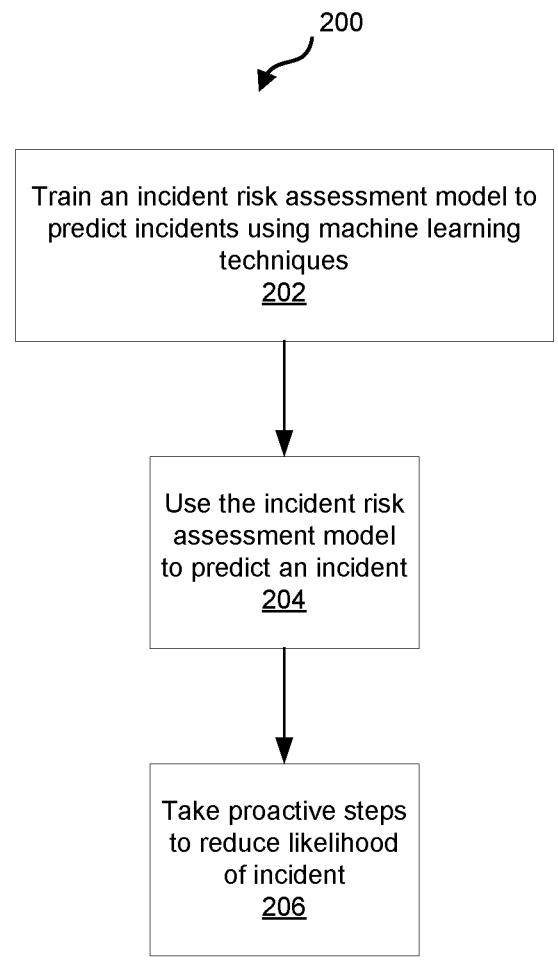
FIG. 2 is a process flow chart depicting an example process in an example incident risk assessment system, in accordance with some embodiments.

FIG. 2 is a process flow chart depicting an example process in an example incident risk assessment system. A service provider of a cloud-based multi-tenant environment may use the example incident risk assessment system to train an incident risk assessment model to predict incidents using machine learning techniques (operation 202). The service provider may then use the trained incident risk assessment model to monitor the cloud-based infrastructure and predict an incident and root causes of the predicted incident (operation 204). The service provider may also take proactive steps to reduce the likelihood of any predicted incident occurring (operation 206) and/or reducing the impact if the predicted incident occurs.

Figure 3:
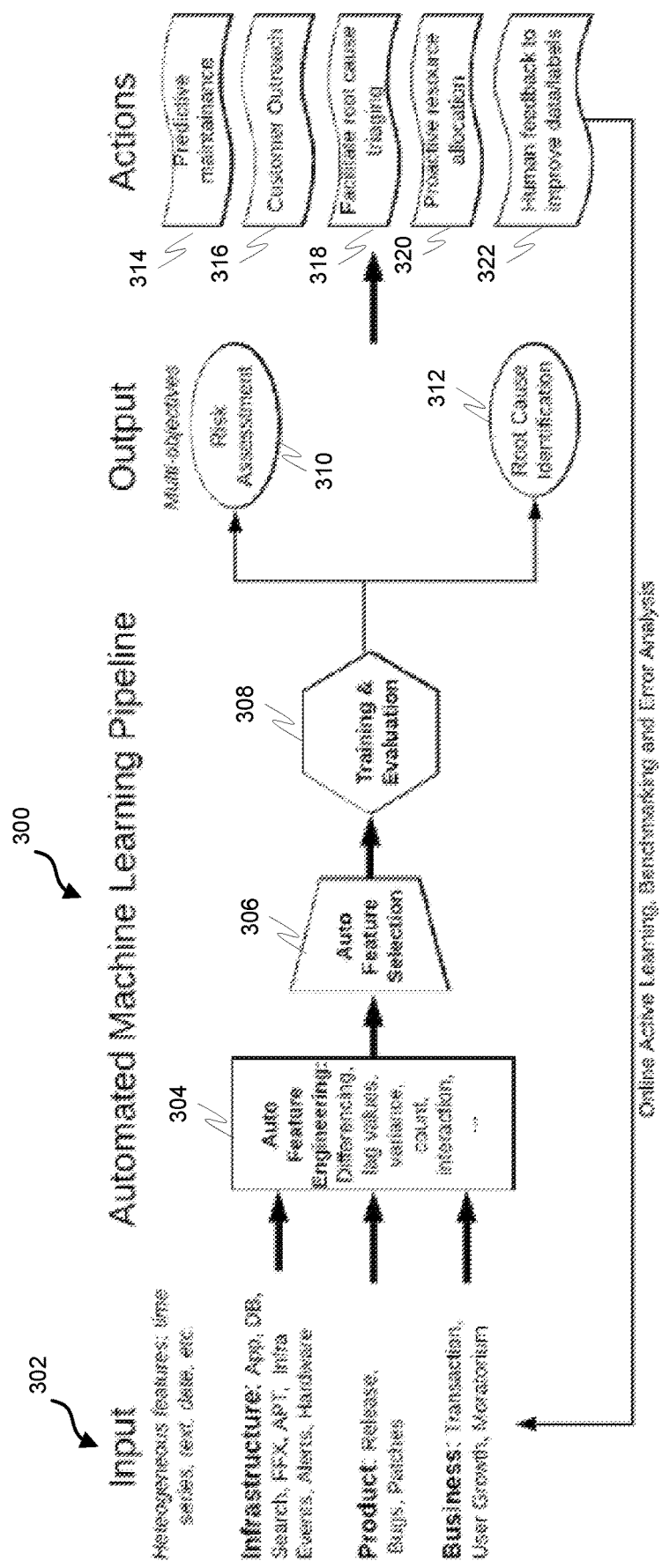
FIG. 3 is a process flow chart depicting an example automated machine learning pipeline for training an incident risk assessment service, in accordance with some embodiments.

FIG. 3 is a process flow chart depicting an example automated machine learning pipeline 300 for training an incident risk assessment ML model. The example pipeline 300 includes, as input 302 to the pipeline 300, a plurality of captured data metrics relating to the multi-tenant cloud environment. In this example, the plurality of data metrics includes data metrics relating to an infrastructure area, a business area, and a product area associated with the multi-tenant cloud environment. The plurality of data metrics relating to the infrastructure area may include data metrics relating to the infrastructure of the multi-tenant cloud environment, the plurality of data metrics relating to the business area may include data metrics relating to client use of the multi-tenant cloud environment, and the plurality of data metrics in the product area relating to the product area may include data metrics relating to product development in the multi-tenant cloud environment.

Examples of data metrics from the infrastructure area may include system metrics such as application cpu (e.g., percentage of CPU utilization with respect to its highest possible load at servers dedicated to core application), database cpu (e.g., percentage of CPU utilization with respect to its highest possible load at servers dedicated to databases), search cpu (e.g., percentage of CPU utilization with respect to its highest possible load at servers dedicated to search), file storage, database storage, average page time, infrastructure events (e.g., changes in physical hardware and server configuration that include predictable, planned, scheduled or otherwise administered events such as rerouting/switching from one set of hosts to another (instance/hardware refresh), expansion in number of servers (capacity additions), as well as events that are generally random and rare, but can be predicted with some probability, such as failures due to cosmic rays), hardware failures, and others. Examples of data metrics from the product area may include data about release schedule, bugs reports, patching activities, and others. Examples of data metrics from the business area may include data on transactions, user growth, moratoriums, and others. Collection of data metrics from these areas can result in a heterogeneous feature data set consisting of time series, text and date types among others.

The example pipeline 300 includes an automatic feature engineering stage 304 wherein derived features are automatically generated from the plurality of data metrics. The derived features include one or more features that describe the temporal patterns of one or more data metrics and their compounding effect over time such as differencing, lag values, variance, count, interaction, etc. The automatically generating derived features from the plurality of data metrics may include automatically generating derived features from the plurality of data metrics relating to the infrastructure area, the business area, and the product area.

During the auto-feature engineering stage 304 new derived features are automatically created. An example of such features are lagged time series such as for example one week lag in order to account for seasonality effects or delay effects. Other examples include taking differences and/or derivatives of features, variances, counts and so on. During feature engineering the heterogeneous features can be converted to a common usable feature data frame. For example, features such as "days after a moratorium is lifted" can be created or "number of incidents that happened last week" can be introduced to capture repeated incidents.

The example pipeline 300 includes an automatic feature selection stage 306 wherein relevant features are automatically selected from the derived features and the captured data metrics. The relevant features that are selected are sufficient to explain the temporal variations of an incident occurrence that is to be predicted. In the example feature selection stage 306, the features that best explain the variance of the target to be predicted (e.g., incident occurrence) are auto selected to avoid data redundancy and reduce the dimensionality of the problem. The quantity of "top best" features are also automatically selected as this varies by incident.

The example pipeline 300 includes a training and evaluation stage 308 wherein an incident risk assessment model is automatically trained, tested, and evaluated using machine learning techniques with the selected relevant features. The incident risk assessment model is trained to predict the risk of an incident (risk assessment output 310) in the multi-tenant cloud environment within a specified time window in the future, provide an explanation of possible root causes of the incident (root cause identification output 312), and may assign a strength level to each possible root cause, wherein the strength level of a given cause changes over time.

In the example training and model evaluation stage 308, the incident risk assessment model is trained using a portion of the selected relevant feature data frame, and other portions of the data is used for test and evaluation of the model. The temporal relevance of an incident to be after the last data point of any of relevant features is preserved both in training and evaluation portions of the data. The example model is framed as a statistical binary classification problem wherein the prediction target is an incident probability in the coming n days, where the number of days can be adjusted. Several ML models may be used including but not limited to Random Forest and Light GBM (gradient boosting with tree based learning algorithm). Additionally, class re-weights and under-sampling on the predicted variable may be used because the problem involves an unbalanced classification problem, as there are many more days without incidents than days with incidents.

The trained model can then be used to predict the risk of an incident in the next few days. The system may output a visualization for predicted risk of an incident, such as a probability diagram, that indicates the probability of an incident at a given instance within a specified time window as this window slides over a range of dates. The colors in a probability diagram can represent the probability of an incident occurring on a particular date. Combined display of multiple probability diagrams can be represented together in a visualization such as a heat map where one can track a probability of an incident for a particular instance within a specified time window as it slides over a range of dates in parallel to probabilities of incidents at other instances.

Output from the trained incident risk assessment model may allow a number of proactive actions by a multi-tenant service provider to prevent, recover more quickly from, and/or reduce the effect of an incident. The proactive actions may include predictive maintenance 314, customer outreach 316, facilitating root cause triaging 318, and proactive resource allocation 320. Output from the trained incident risk assessment model may also be reviewed/evaluated and human feedback provided 322 to improve the model accuracy, for example, by improving the data/labels used to train the incident risk assessment model.

Figure 4:
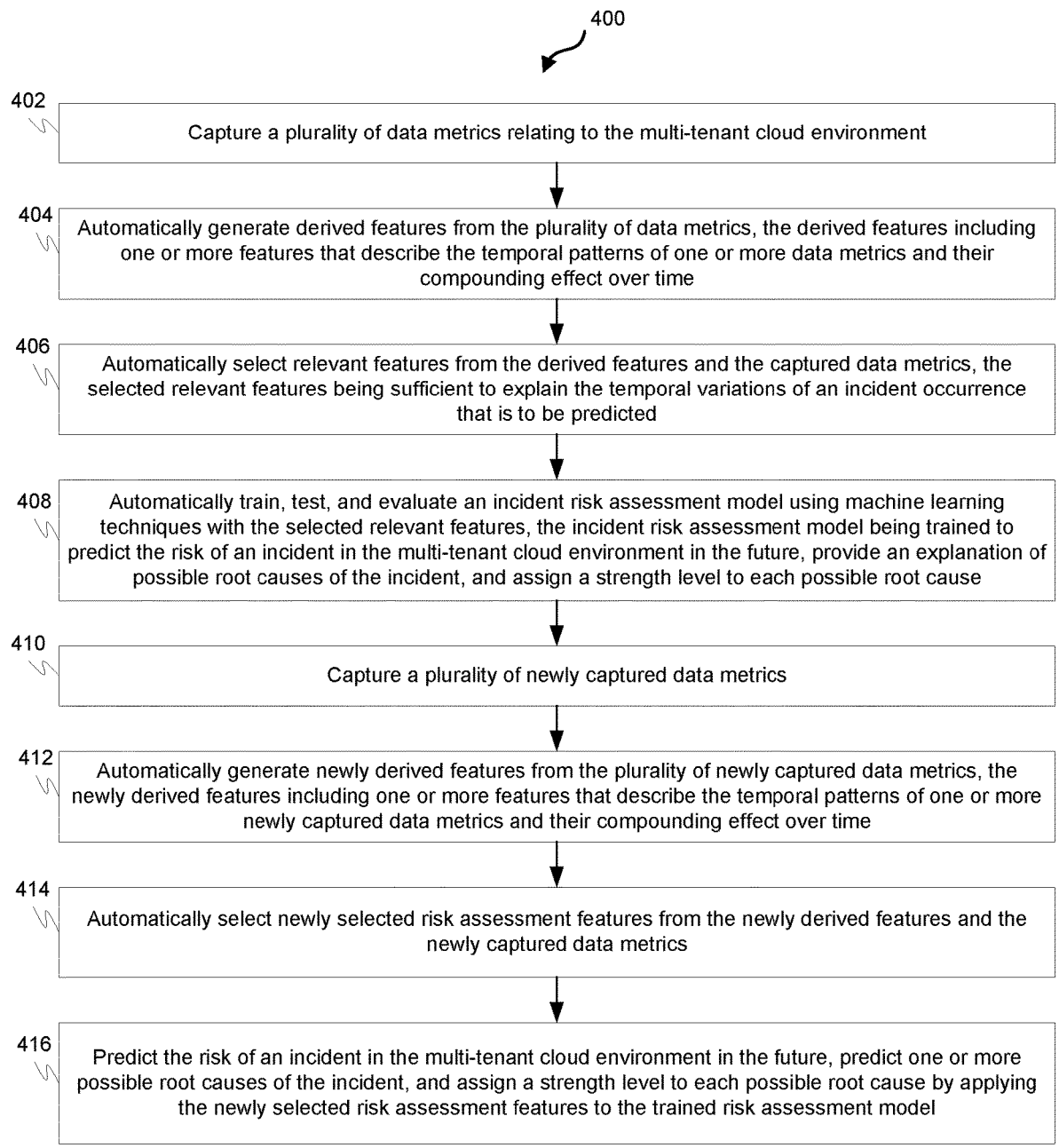
FIG. 4 is a process flow chart depicting an example process for using an incident risk assessment machine learning model, in accordance with some embodiments.

FIG. 4 is a process flow chart depicting an example process 400 for training an incident risk assessment ML model. The order of operation within the example process 400 is not limited to the sequential execution as illustrated in the figure, but may be performed in one or more varying orders as applicable and in accordance with the present disclosure.

The example process 400 includes capturing a plurality of data metrics relating to the multi-tenant cloud environment (operation 402). The capturing a plurality of data metrics relating to the multi-tenant cloud environment may include capturing a plurality of data metrics relating to an infrastructure area, a business area, and a product area associated with the multi-tenant cloud environment. The plurality of data metrics relating to the infrastructure area may include data metrics relating to the infrastructure of the multi-tenant cloud environment, the plurality of data metrics relating to the business area may include data metrics relating to client use of the multi-tenant cloud environment, and the plurality of data metrics in the product area relating to the product area may include data metrics relating to product development in the multi-tenant cloud environment.

The example process 400 includes automatically generating derived features from the plurality of data metrics (operation 404). The derived features include one or more features that describe the temporal patterns of one or more data metrics and their compounding effect over time. The automatically generating derived features from the plurality of data metrics may include automatically generating derived features from the plurality of data metrics relating to the infrastructure area, the business area, and the product area.

The example process 400 includes automatically selecting relevant features from the derived features and the captured data metrics (operation 406). The selected relevant features are sufficient to explain the temporal variations of an incident occurrence that is to be predicted.

The example process 400 includes automatically training, testing, and evaluating an incident risk assessment model using machine learning techniques with the selected relevant features (operation 408). The incident risk assessment model is trained to predict the risk of an incident in the multi-tenant cloud environment within a specified time window in the future, provide an explanation of possible root causes of the incident, and assign a strength level to each possible root cause.

The example process 400 includes capturing a plurality of newly captured data metrics (operation 410). The capturing a plurality of newly captured data metrics may include capturing a plurality of newly captured data metrics relating to the infrastructure area, the business area, and the product area.

The example process 400 includes automatically generating newly derived features from the plurality of newly captured data metrics (operation 412). The newly derived features include one or more features that describe the temporal patterns of one or more newly captured data metrics and their compounding effect over time.

The example process 400 includes automatically selecting newly selected risk assessment features from the newly derived features and the newly captured data metrics (operation 414). The automatically generating newly derived features from the plurality of newly captured data metrics may include automatically generating newly derived features from the plurality of newly captured data metrics relating to the infrastructure area, the business area, and the product area.

The example process 400 includes predicting the risk of an incident in the multi-tenant cloud environment within a predefined time window in the future by applying the newly selected risk assessment features to the trained risk assessment model (operation 416). The example process 400 may further include assigning a strength level to each possible root cause by applying the newly selected risk assessment features to the trained risk assessment model.

The subject matter described herein discloses apparatus, systems, techniques and articles for early warning and risk assessment of incidents in a multi-tenant cloud environment. In one embodiment, a processor-implemented method comprises: capturing a plurality of data metrics; automatically generating derived features from the plurality of captured data metrics; automatically selecting risk assessment features from the derived features and the captured data metrics; and predicting the risk of an incident in the multi-tenant cloud environment within a specified time window in the future and one or more possible root causes of the incident by applying the newly selected risk assessment features to a trained risk assessment model, wherein the trained risk assessment model has been trained using machine learning techniques to predict the risk of an incident in the multi-tenant cloud environment within a specified time window in the future, provide an explanation of possible root causes of the incident, and assign a strength level to each possible root cause.

In another embodiment, a processor-implemented method of early warning and risk assessment of incidents in a multi-tenant cloud environment is provided. The method comprises: capturing a plurality of data metrics relating to the multi-tenant cloud environment; automatically generating derived features from the plurality of data metrics, wherein the derived features include one or more features that describe the temporal patterns of one or more data metrics and their compounding effect over time; automatically selecting relevant features from the derived features and the captured data metrics, wherein the selected relevant features are sufficient to explain the temporal variations of an incident occurrence that is to be predicted; automatically training, testing, and evaluating an incident risk assessment model using machine learning techniques with the selected relevant features, wherein the incident risk assessment model is trained to predict the risk of an incident in the multi-tenant cloud environment within a specified time window in the future, provide an explanation of possible root causes of the incident, and assign a strength level to each possible root cause; capturing a plurality of newly captured data metrics; automatically generating newly derived features from the plurality of newly captured data metrics, wherein the newly derived features include one or more features that describe the temporal patterns of one or more newly captured data metrics and their compounding effect over time; automatically selecting newly selected risk assessment features from the newly derived features and the newly captured data metrics; and predicting the risk of an incident in the multi-tenant cloud environment within a specified time window in the future and one or more possible root causes of the incident by applying the newly selected risk assessment features to the trained risk assessment model.

These aspects and other embodiments may include one or more of the following features. The method may further comprise assigning a strength level to each possible root cause by applying the newly selected risk assessment features to the trained risk assessment model. The method may further comprise adjusting the trained incident risk assessment model using received human feedback. The capturing a plurality of data metrics relating to the multi-tenant cloud environment may comprise capturing a plurality of data metrics relating to an infrastructure area, a business area, and a product area associated with the multi-tenant cloud environment. The plurality of data metrics relating to the infrastructure area may include data metrics relating to the infrastructure of the multi-tenant cloud environment, the plurality of data metrics relating to the business area may include data metrics relating to client use of the multi-tenant cloud environment, and the plurality of data metrics in the product area relating to the product area may include data metrics relating to product development in the multi-tenant cloud environment. The automatically generating derived features from the plurality of data metrics may comprise automatically generating derived features from the plurality of data metrics relating to the infrastructure area, the business area, and the product area. The capturing a plurality of newly captured data metrics may comprise capturing a plurality of newly captured data metrics relating to the infrastructure area, the business area, and the product area. The automatically generating newly derived features from the plurality of newly captured data metrics may comprise automatically generating newly derived features from the plurality of newly captured data metrics relating to the infrastructure area, the business area, and the product area.

In another embodiment, an early warning and risk assessment system for early warning and risk assessment of incidents in a multi-tenant cloud environment is provided. The system comprises one or more processors configured by programming instructions on non-transitory computer readable media. The system is configured by the programming instruction to: capture a plurality of data metrics relating to the multi-tenant cloud environment; automatically generate derived features from the plurality of data metrics, wherein the derived features include one or more features that describe the temporal patterns of one or more data metrics and their compounding effect over time; automatically select relevant features from the derived features and the captured data metrics, wherein the selected relevant features are sufficient to explain the temporal variations of an incident occurrence that is to be predicted; automatically train, test, and evaluate an incident risk assessment model using machine learning techniques with the selected relevant features, wherein the incident risk assessment model is trained to predict the risk of an incident in the multi-tenant cloud environment within a specified time window in the future, provide an explanation of possible root causes of the incident, and assign a strength level to each possible root cause; capture a plurality of newly captured data metrics; automatically generate newly derived features from the plurality of newly captured data metrics, wherein the newly derived features include one or more features that describe the temporal patterns of one or more newly captured data metrics and their compounding effect over time; automatically select newly selected risk assessment features from the newly derived features and the newly captured data metrics; and predict the risk of an incident in the multi-tenant cloud environment within a predefined time window in the future and one or more possible root causes of the incident by applying the newly selected risk assessment features to the trained risk assessment model.

These aspects and other embodiments may include one or more of the following features. The system may be further configured to assign a strength level to each possible root cause by applying the newly selected risk assessment features to the trained risk assessment model. The system may be configured to adjust the trained incident risk assessment model using received human feedback. The system may be configured to capture a plurality of data metrics relating to the multi-tenant cloud environment by capturing a plurality of data metrics relating to an infrastructure area, a business area, and a product area associated with the multi-tenant cloud environment. The plurality of data metrics relating to the infrastructure area may include data metrics relating to the infrastructure of the multi-tenant cloud environment, the plurality of data metrics relating to the business area may include data metrics relating to client use of the multi-tenant cloud environment, and the plurality of data metrics in the product area relating to the product area may include data metrics relating to product development in the multi-tenant cloud environment. The system may be configured to automatically generate derived features from the plurality of data metrics by automatically generating derived features from the plurality of data metrics relating to the infrastructure area, the business area, and the product area. The system may be configured to capture a plurality of newly captured data metrics by capturing a plurality of newly captured data metrics relating to the infrastructure area, the business area, and the product area. The system may be configured to automatically generate newly derived features from the plurality of newly captured data metrics by automatically generating newly derived features from the plurality of newly captured data metrics relating to the infrastructure area, the business area, and the product area.

In another embodiment, a processor-implemented method of early warning and risk assessment of incidents in a multi-tenant cloud environment is provided. The method comprises: capturing, by a processor, a plurality of newly captured data metrics; automatically generating, by the processor, newly derived features from the plurality of newly captured data metrics, wherein the newly derived features include one or more features that describe the temporal patterns of one or more newly captured data metrics and their compounding effect over time; automatically selecting, by the processor, newly selected risk assessment features from the newly derived features and the newly captured data metrics; and predicting, by the processor, the risk of an incident in the multi-tenant cloud environment within a specified time window in the future and one or more possible root causes of the incident by applying the newly selected risk assessment features to a trained risk assessment model, wherein the trained risk assessment model has been trained using a method comprising: capturing a plurality of data metrics relating to the multi-tenant cloud environment; automatically generating derived features from the plurality of data metrics, wherein the derived features include one or more features that describe the temporal patterns of one or more data metrics and their compounding effect over time; automatically selecting relevant features from the derived features and the captured data metrics, wherein the selected relevant features are sufficient to explain the temporal variations of an incident occurrence that is to be predicted; automatically training, testing, and evaluating the incident risk assessment model using machine learning techniques with the selected relevant features, wherein the incident risk assessment model is trained to predict the risk of an incident in the multi-tenant cloud environment within a specified time window in the future, provide an explanation of possible root causes of the incident, and assign a strength level to each possible root cause.

These aspects and other embodiments may include one or more of the following features. The method may further comprise assigning, by the processor, a strength level to each possible root cause by applying the newly selected risk assessment features to the trained risk assessment model. The method may further comprise adjusting the trained incident risk assessment model using received human feedback. The capturing a plurality of data metrics relating to the multi-tenant cloud environment may comprise capturing a plurality of data metrics relating to an infrastructure area, a business area, and a product area associated with the multi-tenant cloud environment. The plurality of data metrics relating to the infrastructure area may include data metrics relating to the infrastructure of the multi-tenant cloud environment, the plurality of data metrics relating to the business area may include data metrics relating to client use of the multi-tenant cloud environment, and the plurality of data metrics in the product area relating to the product area may include data metrics relating to product development in the multi-tenant cloud environment. The automatically generating derived features from the plurality of data metrics may comprise automatically generating derived features from the plurality of data metrics relating to the infrastructure area, the business area, and the product area. The capturing a plurality of newly captured data metrics may comprise capturing a plurality of newly captured data metrics relating to the infrastructure area, the business area, and the product area. The automatically generating newly derived features from the plurality of newly captured data metrics may comprise automatically generating newly derived features from the plurality of newly captured data metrics relating to the infrastructure area, the business area, and the product area.

In another embodiment, a processor-implemented method of early warning and risk assessment of incidents in a multi-tenant cloud environment is provided. The method comprises: capturing a plurality of data metrics relating to an infrastructure area, a business area, and a product area associated with the multi-tenant cloud environment, wherein the plurality of data metrics relating to the infrastructure area include data metrics relating to the infrastructure of the multi-tenant cloud environment, the plurality of data metrics relating to the business area include data metrics relating to client use of the multi-tenant cloud environment, and the plurality of data metrics in the product area relating to the product area include data metrics relating to product development in the multi-tenant cloud environment. The method further comprises automatically generating derived features from the plurality of data metrics relating to the infrastructure area, the business area, and the product area, wherein the derived features include one or more features that describe the temporal patterns of one or more data metrics and their compounding effect over time; automatically selecting relevant features from the derived features and the captured data metrics, wherein the selected relevant features are sufficient to explain the temporal variations of a target that is to be predicted (e.g., incident occurrence); automatically training, testing, and evaluating an incident risk assessment model using machine learning techniques with the selected relevant features, wherein the incident risk assessment model is trained to predict the risk of an incident in the multi-tenant cloud environment within a specified time window in the future, provide an explanation of possible root causes of the incident, and assign a strength level to each possible root cause; capturing a plurality of newly captured data metrics relating to the infrastructure area, the business area, and the product area; automatically generating newly derived features from the plurality of newly captured data metrics relating to the infrastructure area, the business area, and the product area; automatically selecting newly selected risk assessment features from the newly derived features and the newly captured data metrics; and predicting the risk of an incident in the multi-tenant cloud environment in the future days within a predefined time window, providing an explanation of possible root causes of the incident, and assigning a strength level to each possible root cause by applying the newly selected risk assessment features to the trained risk assessment model.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of reducing incidents in a future time window in a computing environment that implements a multi-tenant cloud environment, the method comprising:
    capturing, by a processor in the computing environment, a plurality of data metrics relating to the multi-tenant cloud environment;
    automatically generating, by the processor, derived features from the plurality of data metrics, the derived features including one or more features that describe temporal patterns of one or more data metrics and their compounding effect over time;
    automatically selecting, by the processor, relevant features from the derived features and the captured data metrics, the selected relevant features being sufficient to explain temporal variations of a potential incident occurrence that is to be predicted;
    automatically training, by the processor, an incident risk assessment model using machine learning techniques with a portion of the selected relevant features;
    automatically testing and evaluating, by the processor, the incident risk assessment model with another portion of the selected relevant features, the incident risk assessment model being trained to predict the risk of a potential incident in the multi-tenant cloud environment within a specified time window in the future, provide an explanation of possible root causes of the potential incident, and assign a strength level to each possible root cause;
    receiving, by the processor, human feedback for adjusting the trained incident risk assessment model;
    improving, by the processor, the trained incident risk assessment model based on the human feedback by improving data or labels used to train the incident risk assessment model;
    capturing, by the processor, a plurality of newly captured data metrics;
    automatically generating, by the processor, newly derived features from the plurality of newly captured data metrics, the newly derived features including one or more features that describe the temporal patterns of one or more newly captured data metrics and their compounding effect over time;
    automatically selecting, by the processor, newly selected risk assessment features from the newly derived features and the newly captured data metrics;
    applying, by the processor, the newly selected risk assessment features as inputs to the trained incident risk assessment model;
    providing, by the processor, an output from the trained incident risk assessment model for use by a multi-tenant service provider that predicts the risk of a predicted incident in the multi-tenant cloud environment within a specified time window in the future and one or more possible root causes of the predicted incident; and
    performing, by the multi-tenant service provider, one or more of predictive maintenance, root cause triaging, or proactive resource allocation in the multi-tenant cloud environment based on the output to prevent, reduce a likelihood of, recover more quickly from, or reduce the effect of the predicted incident.

2. The method of claim 1, further comprising: assigning a strength level to each possible root cause by applying the newly selected risk assessment features to the trained incident risk assessment model.

3. The method of claim 1, wherein the capturing a plurality of data metrics relating to the multi-tenant cloud environment comprises capturing a plurality of data metrics relating to an infrastructure area, a business area, and a product area associated with the multi-tenant cloud environment.

4. The method of claim 3, wherein the plurality of data metrics relating to the infrastructure area include data metrics relating to the infrastructure of the multi-tenant cloud environment, the plurality of data metrics relating to the business area include data metrics relating to client use of the multi-tenant cloud environment, and the plurality of data metrics in the product area relating to the product area include data metrics relating to product development in the multi-tenant cloud environment.

5. The method of claim 4, wherein the automatically generating derived features from the plurality of data metrics comprises automatically generating derived features from the plurality of data metrics relating to the infrastructure area, the business area, and the product area.

6. The method of claim 5, wherein the capturing a plurality of newly captured data metrics comprises capturing a plurality of newly captured data metrics relating to the infrastructure area, the business area, and the product area.

7. The method of claim 6, wherein the automatically generating newly derived features from the plurality of newly captured data metrics comprises automatically generating newly derived features from the plurality of newly captured data metrics relating to the infrastructure area, the business area, and the product area.

8. A computing environment that implements a multi-tenant cloud environment, the computing environment comprising one or more processors configured by programming instructions on non-transitory computer readable media, the computing environment configured by the programming instruction to:
    capture a plurality of data metrics relating to the multi-tenant cloud environment;
    automatically generate derived features from the plurality of data metrics, the derived features including one or more features that describe temporal patterns of one or more data metrics and their compounding effect over time;
    automatically select relevant features from the derived features and the captured data metrics, the selected relevant features being sufficient to explain temporal variations of a potential incident occurrence that is to be predicted;
    automatically train an incident risk assessment model using machine learning techniques with a portion of the selected relevant features;

test and evaluate the incident risk assessment model with another portion of the selected relevant features, the incident risk assessment model being trained to predict the risk of a potential incident in the multi-tenant cloud environment within a specified time window in the future, provide an explanation of possible root causes of the potential incident, and assign a strength level to each possible root cause;

receive human feedback for adjusting the trained incident risk assessment model;

improve the trained incident risk assessment model based on the human feedback by improving data or labels used to train the incident risk assessment model;

capture a plurality of newly captured data metrics;

automatically generate newly derived features from the plurality of newly captured data metrics, the newly derived features including one or more features that describe the temporal patterns of one or more newly captured data metrics and their compounding effect over time;

automatically select newly selected risk assessment features from the newly derived features and the newly captured data metrics;

apply the newly selected risk assessment features as inputs to the trained incident risk assessment model; and provide an output from the trained incident risk assessment model for use by a multi-tenant service provider that predicts the risk of a predicted incident in the multi-tenant cloud environment within a specified time window in the future and one or more possible root causes of the predicted incident;

wherein the multi-tenant service provider performs one or more of predictive maintenance, root cause triaging, or proactive resource allocation in the multi-tenant cloud environment based on the output.

9. The system of claim 8, further configured to: assign a strength level to each possible root cause by applying the newly selected risk assessment features to the trained incident risk assessment model.

10. The system of claim 8, wherein the system is configured to capture a plurality of data metrics relating to the multi-tenant cloud environment by capturing a plurality of data metrics relating to an infrastructure area, a business area, and a product area associated with the multi-tenant cloud environment.

11. The system of claim 10, wherein the plurality of data metrics relating to the infrastructure area include data metrics relating to the infrastructure of the multi-tenant cloud environment, the plurality of data metrics relating to the business area include data metrics relating to client use of the multi-tenant cloud environment, and the plurality of data metrics in the product area relating to the product area include data metrics relating to product development in the multi-tenant cloud environment.

12. The system of claim 11, wherein the system is configured to automatically generate derived features from the plurality of data metrics by automatically generating derived features from the plurality of data metrics relating to the infrastructure area, the business area, and the product area.

13. The system of claim 12, wherein the system is configured to capture a plurality of newly captured data metrics by capturing a plurality of newly captured data metrics relating to the infrastructure area, the business area, and the product area.

14. The system of claim 13, wherein the system is configured to automatically generate newly derived features from the plurality of newly captured data metrics by automatically generating newly derived features from the plurality of newly captured data metrics relating to the infrastructure area, the business area, and the product area.

15. A method of reducing incidents in a future time window in a computing environment that implements a multi-tenant cloud environment, the method comprising:

capturing, by a processor in the computing environment, a plurality of newly captured data metrics;

automatically generating, by the processor, newly derived features from the plurality of newly captured data metrics, the newly derived features including one or more features that describe temporal patterns of one or more newly captured data metrics and their compounding effect over time;

automatically selecting, by the processor, newly selected risk assessment features from the newly derived features and the newly captured data metrics;

applying, by the processor, the newly selected risk assessment features as inputs to a trained incident risk assessment model, the trained incident risk assessment model having been trained using a method comprising:

capturing, by the processor, a plurality of data metrics relating to the multi-tenant cloud environment;

automatically generating, by the processor, derived features from the plurality of data metrics, the derived features including one or more features that describe the temporal patterns of one or more data metrics and their compounding effect over time;

automatically selecting, by the processor, relevant features from the derived features and the captured data metrics, the selected relevant features being sufficient to explain temporal variations of an incident occurrence that is to be predicted;

automatically training, by the processor, an incident risk assessment model using machine learning techniques with a portion of the selected relevant features; and automatically testing and evaluating, by the processor, the incident risk assessment model with another portion of the selected relevant features, the incident risk assessment model being trained to predict the risk of an incident in the multi-tenant cloud environment within a specified time window in the future, provide an explanation of possible root causes of the incident, and assign a strength level to each possible root cause;

receiving, by the processor, human feedback for adjusting the trained incident risk assessment model;

improving, by the processor, the trained incident risk assessment model based on the human feedback by improving data or labels used to train the incident risk assessment model;

providing an output from the trained incident risk assessment model, by the processor, for use by a multi-tenant service provider, that predicts the risk of a predicted incident in the multi-tenant cloud environment within a specified time window in the future and one or more possible root causes of the predicted incident; and performing, by the multi-tenant service provider, one or more of predictive maintenance, root cause triaging, or proactive resource allocation in the multi-tenant cloud environment based on the output to prevent, reduce a likelihood of, recover more quickly from, or reduce the effect of the predicted incident.

16. The method of claim 15, further comprising: assigning, by the processor, a strength level to each possible root cause by applying the newly selected risk assessment features to the trained incident risk assessment model.

17. The method of claim 15, wherein the capturing a plurality of data metrics relating to the multi-tenant cloud environment comprises capturing a plurality of data metrics relating to an infrastructure area, a business area, and a product area associated with the multi-tenant cloud environment.

18. The method of claim 17, wherein the plurality of data metrics relating to the infrastructure area include data metrics relating to the infrastructure of the multi-tenant cloud environment, the plurality of data metrics relating to the business area include data metrics relating to client use of the multi-tenant cloud environment, and the plurality of data metrics in the product area relating to the product area include data metrics relating to product development in the multi-tenant cloud environment.

19. The method of claim 18, wherein the automatically generating derived features from the plurality of data metrics comprises automatically generating derived features from the plurality of data metrics relating to the infrastructure area, the business area, and the product area.

20. The method of claim 19, wherein:

the capturing a plurality of newly captured data metrics comprises capturing a plurality of newly captured data metrics relating to the infrastructure area, the business area, and the product area; and the automatically generating newly derived features from the plurality of newly captured data metrics comprises automatically generating newly derived features from the plurality of newly captured data metrics relating to the infrastructure area, the business area, and the product area.

* * * * *